United States Patent [19]

Perruzzi

[11] 3,981,547
[45] Sept. 21, 1976

[54] SPIRAL, TAPERED-LAND, JOURNAL BEARING

[76] Inventor: John E. Perruzzi, 7333 New Hampshire Ave. No. 114, Hyattsville, Md. 20783

[22] Filed: July 15, 1975

[21] Appl. No.: 596,119

[52] U.S. Cl. ................................................. 308/98
[51] Int. Cl.² ........................................ F16C 29/00
[58] Field of Search ............... 308/98, 85 R, 85 A, 308/78

[56] References Cited
UNITED STATES PATENTS

| 861,371 | 7/1907 | Latham | 308/98 |
| 1,394,842 | 10/1921 | Kammers | 308/98 |
| 1,422,741 | 7/1922 | Collier | 308/98 |

Primary Examiner—M. H. Wood, Jr.
Assistant Examiner—Gene A. Church
Attorney, Agent, or Firm—R. Sciascia; R. Beers; S. Sheinbein

[57] ABSTRACT

A journal bearing having circumferential grooves therein defining a spiral land. The leading edge of the land is indented either by being tapered or by having a Rayleigh step excised therefrom.

6 Claims, 4 Drawing Figures

SPIRAL, TAPERED-LAND, JOURNAL BEARING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to journal bearings and especially to journal bearings having an indented, circumferential, spiral land along the surface of the journal.

The conventional journal and its bearing have smooth surfaces which are prevented from contacting each other by a film of lubricating oil. In actual operation, the load-bearing surface is an arc much smaller than 360°. This can cause the film of lubricant to be quite thin in the load-bearing area.

Conventional journal bearings also have inherent stability problems which result in the so-called "whirl" and "whip" conditions which can destroy the bearing.

Present journal bearings also are constrained to small length-to-diameter ratios which limit hydrodynamic journal bearing designs and their load-bearing capacities.

SUMMARY OF THE INVENTION

The objects and advantages of the present invention are attained by placing a spiral land around the surface of the journal and indenting the leading edge of the land by means of a ramp or a step.

An object of this invention is to extend the load-bearing surface of journal bearings to the full 360° of arc.

Another object is to extend the length-to-diameter ratio of journal bearings.

A further object is to increase the inherent stability of journal bearings.

Yet another object is to suppress the "whirl" and "whip" problems which occur in journal bearings.

A still further object is to increase the thickness of the lubricating film in journal bearings.

Other objects, advantages and novel features of the present invention will become apparent from the following detailed description of the invention when considered in conjunction with the accompanying drawing.

DETAILED DESCRIPTION OF THE INVENTION

Figure 1:
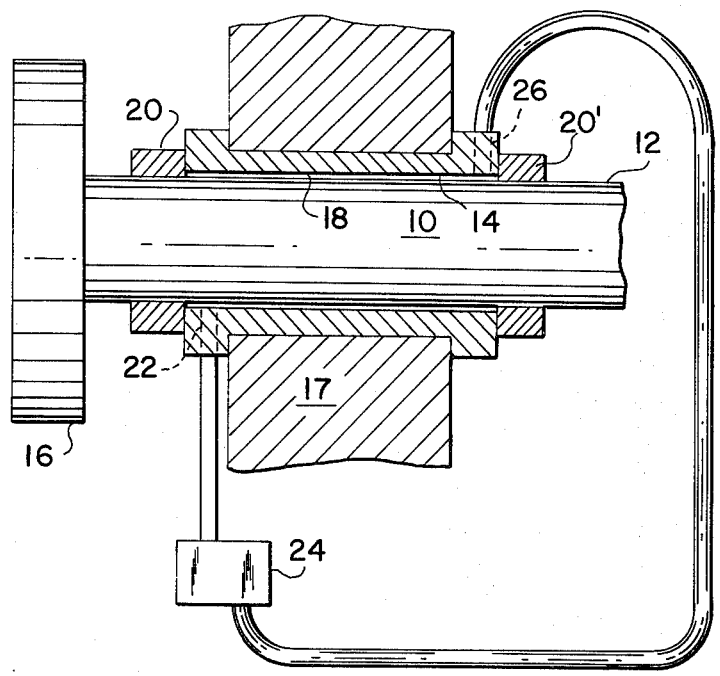
FIG. 1 is a cross-sectional view of a conventional journal bearing.

A conventional type of journal bearing is shown in FIG. 1. The journal 10 at the end of a rotatable shaft 12 is carried in a cylindrical bearing 14. The journal 10 may extend beyond the bearing 14 and be connected to some sort of coupling device 16. The bearing can be supported by a frame 17 of some sort (shown partially).

Lubricating oil (not shown) is inserted in the space 18 between the journal and the bearing. Oil seals 20 and 20' are placed at the ends of the bearing to prevent the oil from leaking out. The oil may be collected and removed at the lower side of the bearing by means of a hole 22 in the bearing, stored in a sump 24 and sent to be reinserted by means of a hole 26. This allows the oil to cool off.

Figure 2:
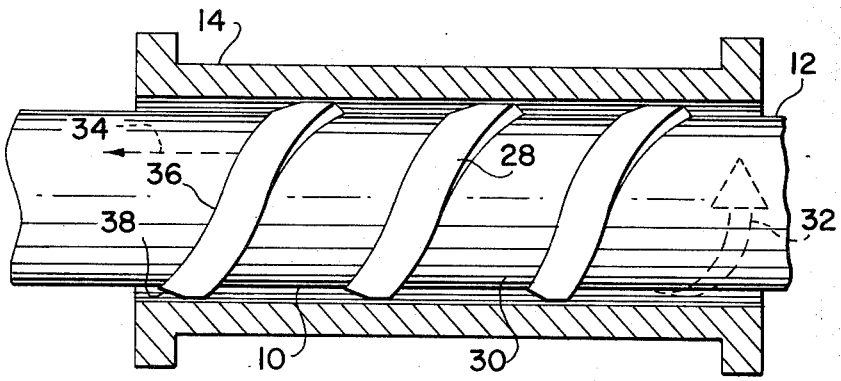
FIG. 2 is a representation of a journal bearing embodying the present invention.

FIG. 2 shows an embodiment of the invention, the associated equipment not being shown. The part of the journal 10 within the bearing 14 now has a spiral land 28 with a groove 30. Each land 28 has a trailing section with a slightly smaller diameter than the inside diameter of cylindrical bearing 14. For the direction of shaft rotation shown by arrow 32, the land sections are shown in FIG. 2 advance to the left as shown by arrow 34. Oil between the journal and the bearing will be pushed to the left by the squeegee action of the advancing land sections. The leading edge of the land is defined as the left edge in FIG. 2, i.e. the edge before which the oil is pushed, or the edge which advances in FIG. 2; it is the edge 36.

The leading edge of the land 28 is formed with a ramp, or taper, 38. The ramp formation is what causes the squeegee action as the land advances.

Figure 3A:
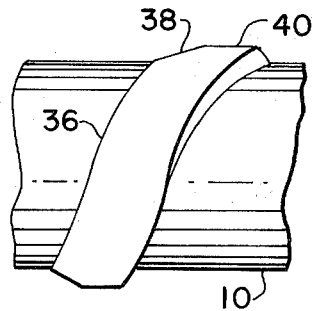
FIG. 3a is a pictorial representation of a land having a ramp-type of indented leading edge.
Figure 3B:
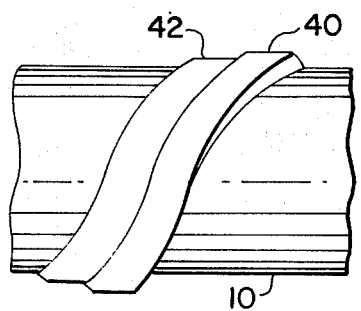
FIG. 3b is a pictorial representation of a land having a Rayleigh step-type of indented leading edge.

The edge of the land is shown in FIG. 3a with an exaggerated angle. The slope of the ramp 38 can be quite small. A second type of land is shown in FIG. 3b. Here, a Rayleigh step is cut back from the leading edge of the land so that, when one looks at the top edge of the land 28, it has a lower section 42 at the leading edge and a higher section 40 at the trailing edge.

The ramp and the step can both be generically referred to as indentations and it is the indented leading edge of the land which causes a wedge of oil to be formed between it and the bearing and pushes the wedge to the left in FIG. 2. Thus, this type of journal bearing can be used as an oil pump.

The wedge of oil in front of the land extends around the whole circumference of the journal so that a fairly equalized reaction pressure is built up along the 360° circle inside the bearing. This fairly equalized reaction pressure tends to center the journal in the bearing much better than the journal in a conventional bearing is centered and thus tends to stabilize the shaft and improve the load-carrying capacity of the bearing.

The shape of the indentation may vary but the ramp and Rayleigh step types are preferred.

Obviously, many modifications and variations of the present invention are possible in light of the above teachings. It is therefore to be understood that, within the scope of the appended claims, the invention may be practiced otherwise than as specifically described.

What is claimed is:
1. A journal bearing comprising:
   a bearing; and
   a journal within said bearing,
   said journal being formed with a circumferential, spiral land having an indented leading section to form an oil wedge to support said journal within said bearing.
2. A bearing as in claim 1, wherein the indentation in said leading section has the form of a ramp.
3. A bearing as in claim 1, wherein the indentation in said leading section has the form of a Rayleigh step.
4. A fluid pump comprising:
   a fluidtight cylindrical housing, having a hole for the insertion of the fluid being pumped, and another hole for the collection and removal of said fluid; and
   a cylindrical journal inside said housing, said journal being formed with a spiral, circumferential land having a trailing section with a slightly smaller diameter than the inside diameter of said housing and with an indented leading section to form an oil wedge to support said journal within said bearing.

5. A pump as in claim 4, wherein the indentation in said leading section has the form of a ramp.

6. A pump as in claim 4, wherein the indentation in said leading section has the form of a Rayleigh step.

* * * * *